Aug. 18, 1931.  W. S. GRAHAM  1,819,679
TRACTOR LISTER ATTACHMENT
Filed Sept. 20, 1930   2 Sheets-Sheet 2
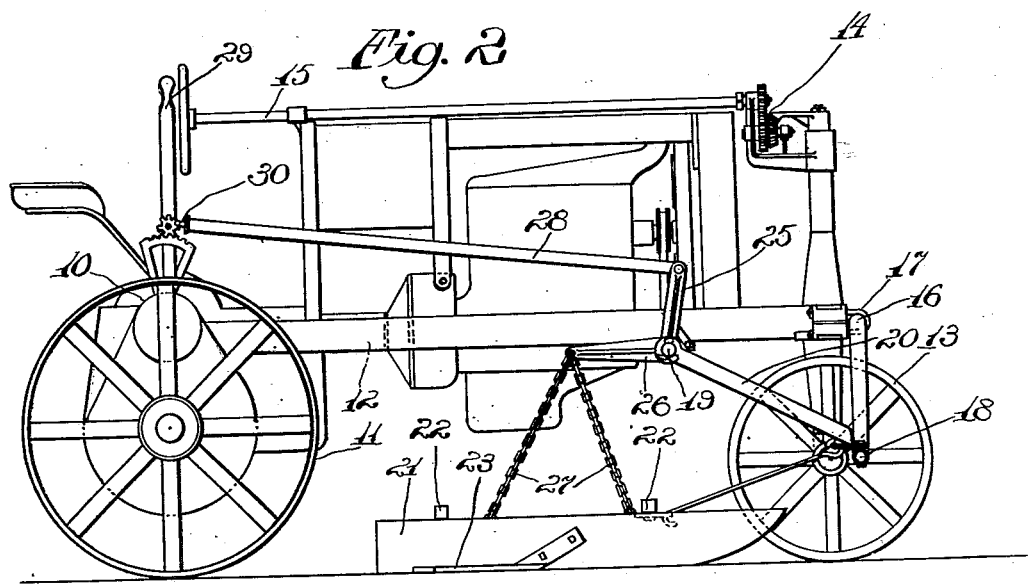
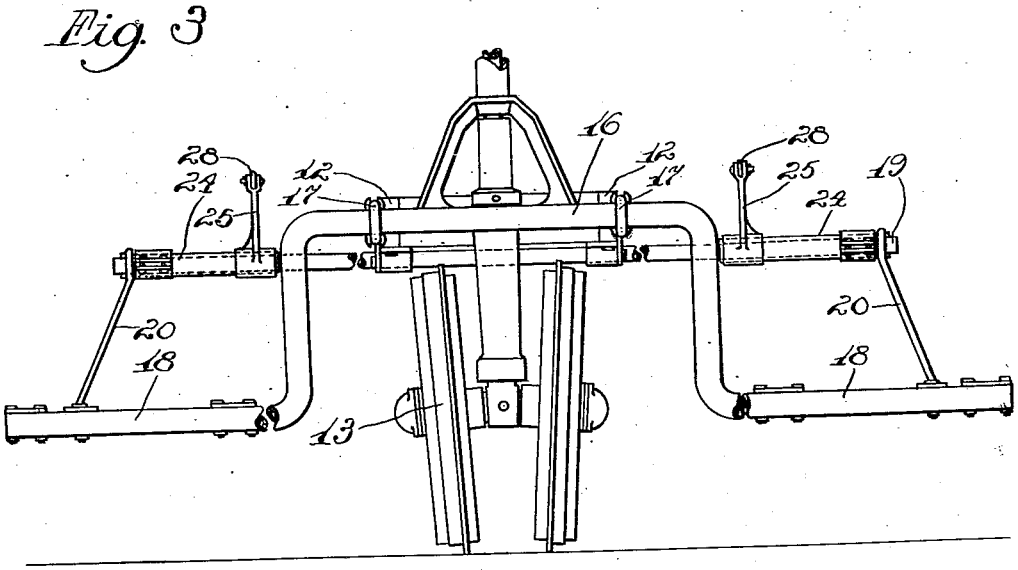
Inventor.
William S. Graham
By H. P. ...
Atty.

Patented Aug. 18, 1931

1,819,679

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

TRACTOR LISTER ATTACHMENT

Application filed September 20, 1930. Serial No. 483,193.

The present invention relates to self-propelled tillage machines, and more specifically to a lister cultivator attachment designed for attachment to tractors of standard type.

The main objects of the invention are to provide a simple structure for connecting lister cultivating units of the row or furrow following type to a row-crop tractor and to incorporate therein draft connections and lifting connections which will allow the units to follow the rows without interference therefrom. Also, to include structure in the lifting and lowering means for the units which will maintain them in horizontal position when raised.

The structure by which the above and other minor objects and advantages are attained is described hereinafter and illustrated in the accompanying drawings, where:

Figure 2 is a side view of the same; and,

Figure 3 is a front view with the lister units omitted.

Figure 1:
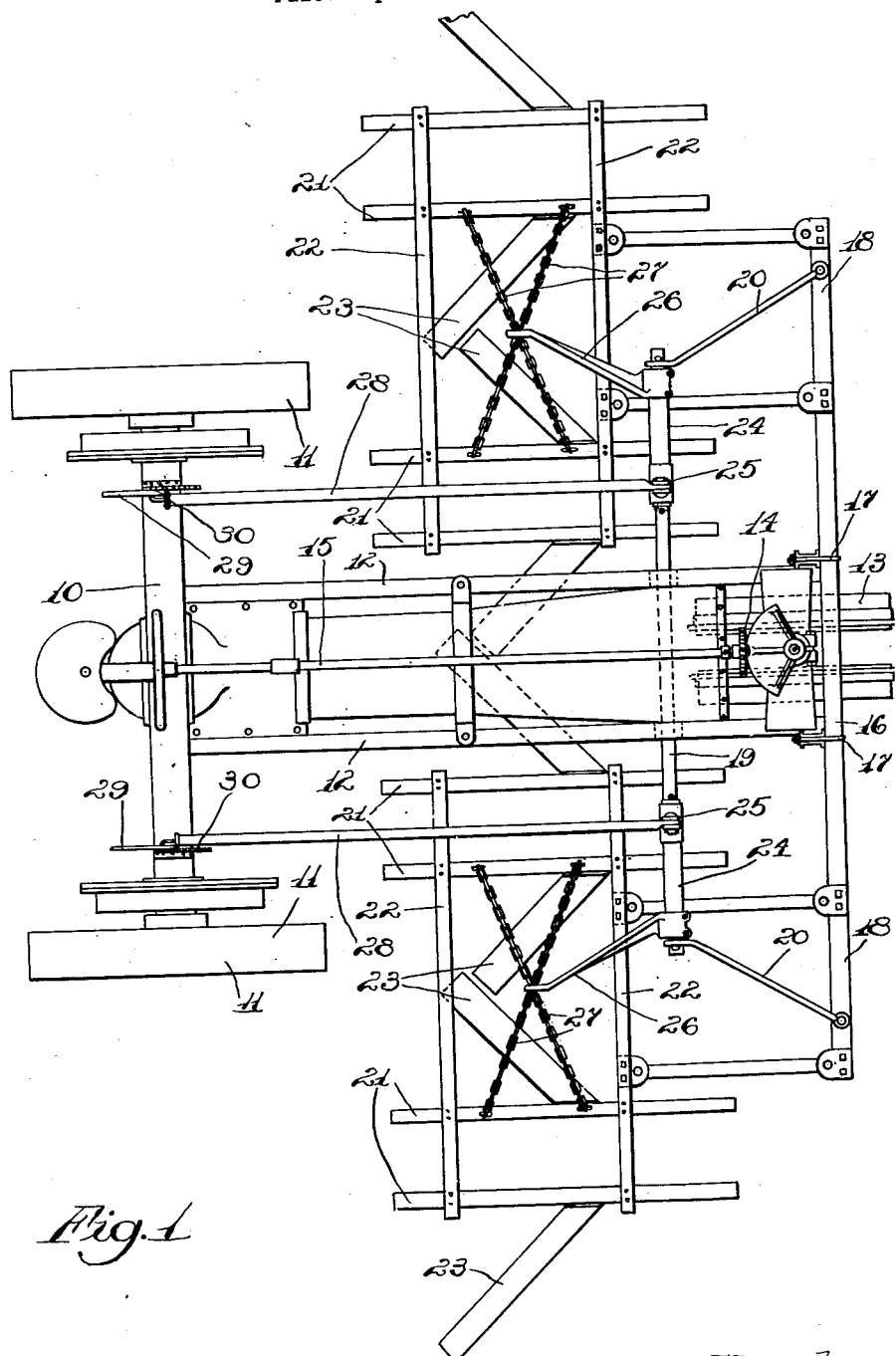
Figure 1 is a plan view of a tractor lister combination embodying the invention.

In its preferred form, the invention is illustrated as including a tractor of the row-crop type comprising an extended arched rear axle structure 10, the depending end housings of which are supported on traction wheels 11. A central narrow body extends forwardly from the axle structure comprising side sills 12 supporting the usual power plant. The front end of the body is carried on a dirigible truck 13 which has a vertical standard swiveled in the body and connected by suitable gears at 14 to a steering shaft and wheel 15 extending to the operator's station over the rear axle. The tractor structure is well known and requires no further description.

The tractor is provided with a transverse draft bar 16 which is detachably secured across the front end of the tractor as by U-bolts 17 engaging implement brackets at each side of the tractor. The draft member is preferably formed with a central upwardly arched portion and transversely aligned lateral extensions or ends 18 which are well below the level of the tractor body and afford a low line of draft connection. The draft bar is preferably in advance of the axis of the truck wheels. A cross-shaft 19 is mounted on the tractor rearwardly of the truck and is clamped to the side sills with its ends overhanging the ground at each side of the tractor body. Brace bars 20 may be used to connect the ends 18 of the draft bar to the ends of the cross-shaft 19. The draft bar and cross-shaft are the carrying means for lister units positioned at each side of the tractor. These are of any usual row following type and are here shown as consisting of a pair of sled lister units comprising the spaced runners 21 for engaging the sides of the plant furrow, which runners are connected by front and rear cross members 22. Cultivator blades 23 extend diagonally rearwardly from the outer side of each runner. The units are so disposed as to follow a plant row, or furrow, at each side of each traction wheel.

Transversely spaced, parallel draft links pivotally connect each unit with one end 18 of the draft bar, the links having a hook and eye connection at each end in order to permit free lateral and vertical movement of the lister units, the effect of the parallel links being to maintain the lister units in parallel relation to the line of travel as they move laterally to follow the rows.

The lifting and lowering means for each unit preferably comprises a short sleeve 24 journaled on each end of the cross-shaft, which sleeve has fixed to it an upstanding arm 25 and a horizontal arm 26 constituting in effect a bell-crank lever. The horizontal arm extends to a point over the center of the pair of connected lister units immediately below it, and the end of the arm is connected to fore and aft points on the respective units by flexible elements such as chains 27. The arm 25 is connected to an actuating rod 28 extending to a hand lever 29 mounted on the axle structure of the tractor and provided with the usual latching means 30. The spaced connections of the suspension chains 27 on the listers will serve to prevent tilting movement thereof when being raised. When lowered, the chains will be slack and will not interfere with side movement of the listers.

The structure described affords a self-propelled four-row lister cultivator of simple structure, in which the units are free to float and follow the plant furrows but are maintained in parallel relation to each other and to the line of travel at all times, and in which the units are held level when raised.

What is claimed is:

1. A self-propelled lister cultivator comprising a tractor having an extended rear axle structure supported on traction wheels and a narrow central body supported on a dirigible truck, a transverse draft bar secured across the front end of the tractor body and provided with end portions at each side of the body extending in transverse alignment below the level of the tractor body, a cross-shaft secured to the tractor body rearwardly of the dirigible truck and forwardly of the axle structure, a pair of transversely spaced row-guided lister units pivotally connected to each end portion of the draft bar by transversely spaced parallel draft links, said units being positioned to follow plant furrows at each side of the tread lines of the respective traction wheels in advance of said wheels, and means on the cross-shaft for lifting and lowering the lister units while maintaining the same in horizontal position.

2. A self-propelled lister cultivator comprising a tractor having an extended rear axle structure supported on traction wheels and a narrow central body supported on a dirigible truck, a pair of transversely spaced row-guided lister units disposed at each side of the tractor body in advance of the traction wheels with the units of each pair on opposite sides of the tread lines of the respective traction wheels, a transverse draft bar on the front of the tractor having its ends extending in front of the lister units, transversely spaced parallel draft links pivotally connecting the ends of the draft bar to the respective units, and means on the tractor for lifting and lowering the units including flexible suspension elements connecting the units to the lifting means.

3. A self-propelled lister cultivator comprising a tractor, a draft bar secured to the front of the tractor, a lifting shaft mounted on the tractor rearwardly of the draft bar, a row-guided implement pivotally connected to the draft bar by parallel transversely spaced links, a bell-crank on the lifting shaft, flexible lifting elements connecting one arm of the bell-crank to the implement, and actuating means connected to the other arm for swinging the bell-crank.

In testimony whereof I affix my signature.

WILLIAM S. GRAHAM.